US006760219B2

United States Patent
Hood, III et al.

(10) Patent No.: US 6,760,219 B2
(45) Date of Patent: Jul. 6, 2004

(54) REMOVABLE HARD DRIVE WITH SHOCK ISOLATION

(75) Inventors: Charles D. Hood, III, Cedar Park, TX (US); Scott Bradley Koester, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 24 days.

(21) Appl. No.: 10/170,809

(22) Filed: Jun. 13, 2002

(65) Prior Publication Data

US 2003/0231463 A1 Dec. 18, 2003

(51) Int. Cl.⁷ ................................................. G06F 1/16
(52) U.S. Cl. ...................... 361/685; 248/636; 248/638
(58) Field of Search ............................... 361/683–687; 248/506–509, 636, 638

(56) References Cited

U.S. PATENT DOCUMENTS

| 5,402,308 A | * | 3/1995 | Koyanagi et al. ............ 361/685 |
| 5,995,364 A | | 11/1999 | McAnally et al. ........... 361/685 |
| 6,122,164 A | | 9/2000 | Liao et al. ................... 361/685 |
| 6,164,614 A | * | 12/2000 | Lim et al. .................... 248/634 |
| 6,477,042 B1 | * | 11/2002 | Allgeyer et al. ............. 361/685 |
| 6,496,362 B2 | * | 12/2002 | Osterhout et al. ........... 361/685 |
| 6,501,644 B1 | * | 12/2002 | Silverman et al. .......... 361/685 |

* cited by examiner

Primary Examiner—Darren Schuberg
Assistant Examiner—Anthony Q. Edwards
(74) Attorney, Agent, or Firm—Hamilton & Terrile, LLP; Stephen A. Terrile

(57) ABSTRACT

The invention relates to a disc drive system which includes cushioning material positioned between the interior of disc drive housing and a disc drive. Such a system advantageously provides a removable disc drive system which isolates shocks from the disc drive. The disc drive system includes a housing bottom, a mounting plate coupled to the housing bottom, and a disc drive coupled to the mounting plate via cushioning pieces.

16 Claims, 4 Drawing Sheets

REMOVABLE HARD DRIVE WITH SHOCK ISOLATION

FIELD OF THE INVENTION

The invention relates generally to hard disc drives and more particularly to an impact shock absorbing hard drives.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hard disc drives are a common source of field failures in information handling systems such as computer systems. Within a hard disc drive are several thin discs, i.e., magnetic media, each having an associated flying head, thus, making hard disc drives sensitive to impact. This is particularly true when the hard disc drive is removable and the impact occurs when the hard disc drive is separate from the computer system.

Upon impact, the heads of the hard disc drive may bounce and contact the discs. The discs may be either broken or scored by such impact. Loose particles may also result from such impact and become free to move around inside the hard disc drive and contact other parts of the hard disc drive thus causing new failures. Furthermore, such impacts may cause shock to the entire hard disc drive housing, not just to the heads.

Attempts to cushion hard disc drives against shock from impact include providing elastomer feet on the bottom or rest surface of the computer system for providing a cushioning effect of the portable computer housing on an associated support surface. These feet serve as friction surfaces to limit lateral movement of the computer system relative to its support surface. Cushioned mounts provide vibration damping but have not addressed the issue of where such mounts should be located to provide maximum protection from impact shocks.

SUMMARY OF THE INVENTION

Accordingly, a disc drive system which includes cushioning material positioned between the interior of disc drive housing and a disc drive advantageously provides a removable disc drive system which isolates shocks from the disc drive.

In one embodiment, the inventions relates to a disc drive system which includes a housing bottom, a mounting plate coupled to the housing bottom, and a disc drive coupled to the mounting plate via cushioning pieces.

In another embodiment, the invention relates to an information handling system which includes a processor, a memory and a disc drive system. The memory is coupled to the processor. The disc drive system includes a housing bottom, a mounting plate and cushioning pieces. The mounting plate is coupled to the housing bottom. The disc drive is coupled to the mounting plate via cushioning pieces.

In another embodiment, the invention relates to a removable hard drive which includes a housing top, a housing bottom, a mounting plate, a disc drive and cushioning pieces. The housing bottom is coupled to the housing top. The mounting plate is coupled to the housing bottom. The disc drive is coupled to the mounting plate via cushioning pieces.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
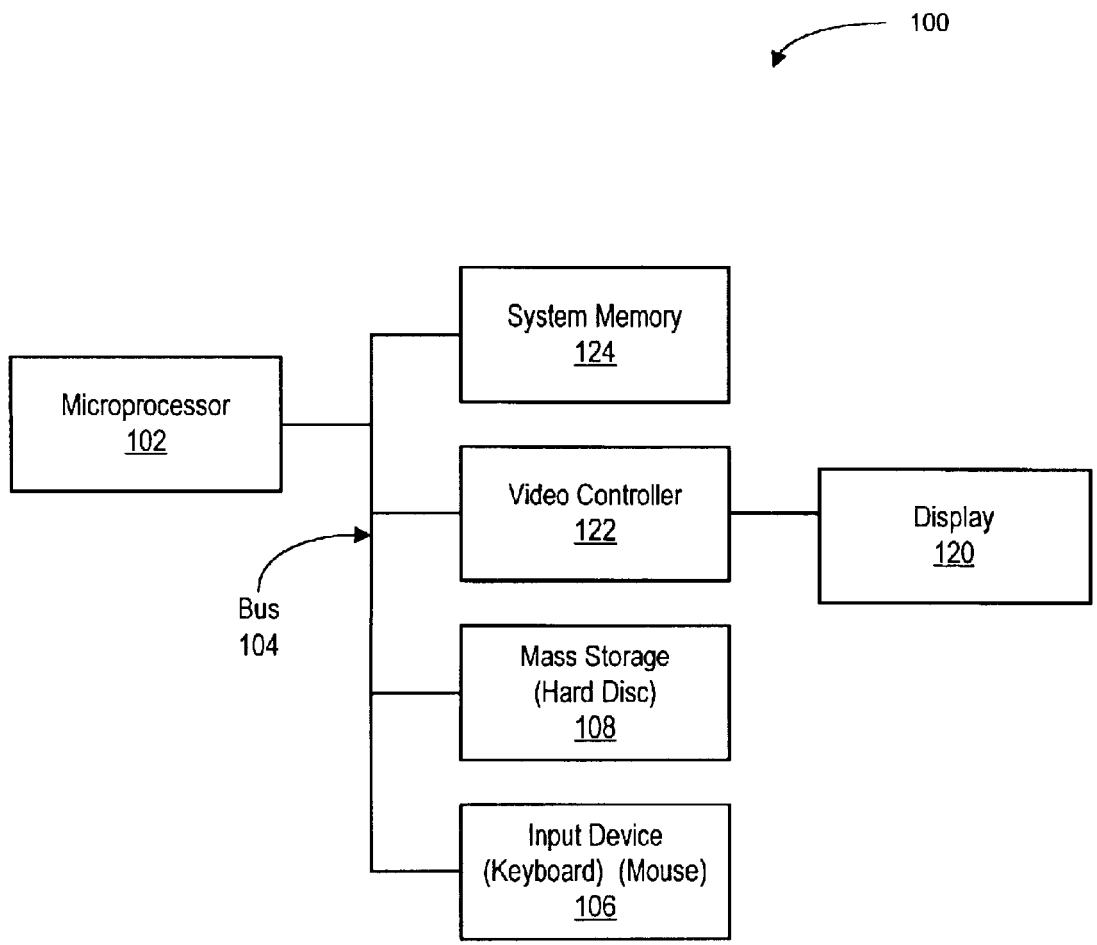
FIG. 1 shows a diagrammatic schematic view of an information handling system.

Referring to FIG. 1, information handling system 100, includes a processor 102, which is coupled to a bus 104. Bus 104 functions as a connection between processor 102 and other components of computer system 100. An input system 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disc drives, optical disks, magneto-optical drives, floppy drives and the like. Computer system 100 further includes a display 120, which is coupled to processor 102 via a video controller 122. A system memory 124 is coupled to processor 102 to provide the processor 102 with fast storage to facilitate execution of computer programs by processor 102. It will be appreciated that other buses and intermediate circuits can be deployed within and information handling system operation of the information handling system.

Figure 2:
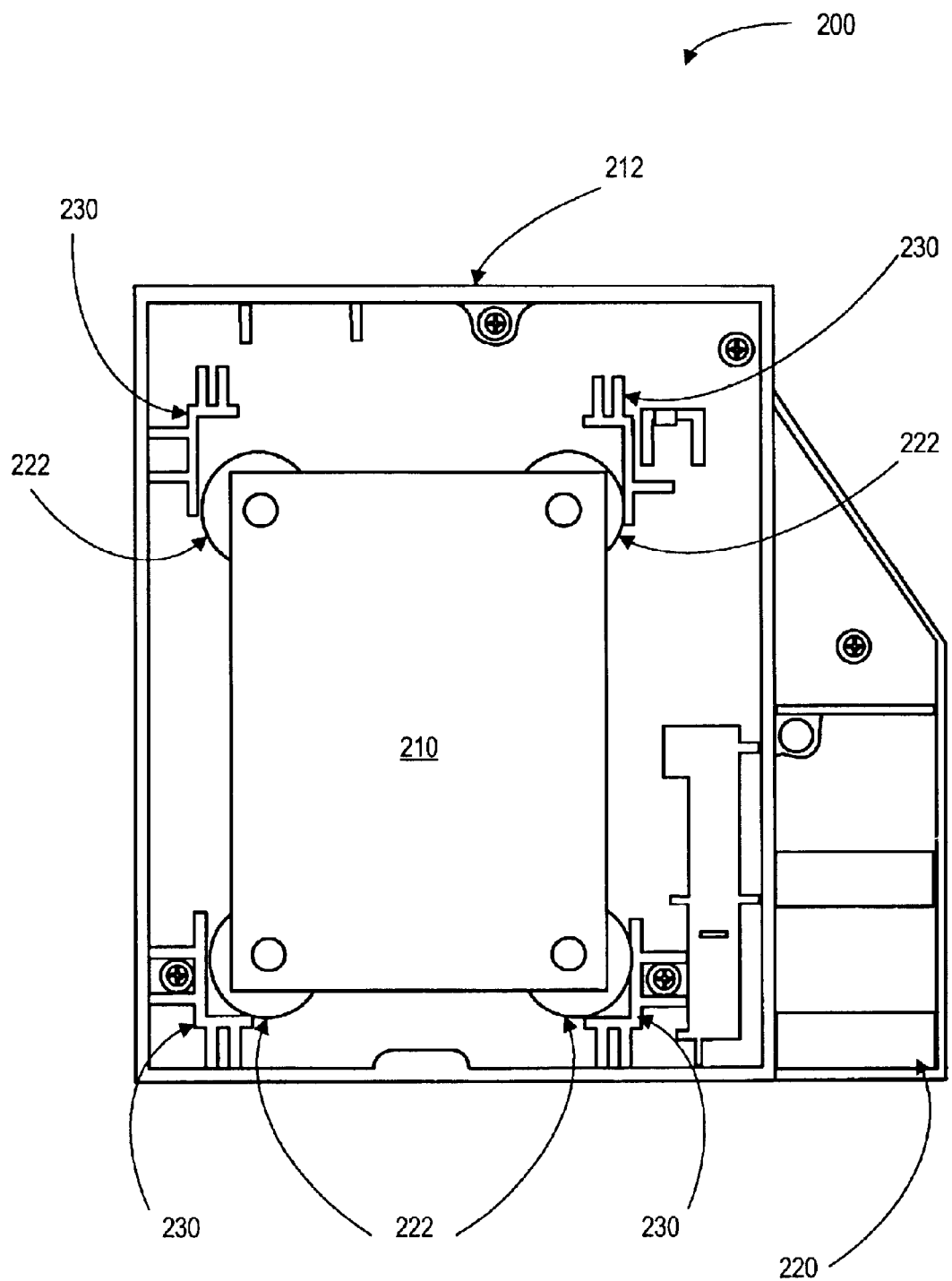
FIG. 2 shows a top view of a hard disc drive system without the cover of the hard disc drive housing.

Referring to FIG. 2, hard disc drive system 200 includes a hard disc drive 210 as well as a hard disc drive housing bottom 212. The hard disc drive 210 is coupled to the hard disc drive housing bottom 212 via a mounting plate 220 and cushioning devices 222, which are constructed of, e.g., foam. In a preferred embodiment, the foam includes double sided adhesive and mounting plate 220 is attached to the housing 212 via the double sided adhesive foam. The adhesive foam absorbs shock energy and effectively reduces the shock experienced by the hard disc drive 212 if the hard disc drive system 200 receives a shock such as when the system is dropped. Accordingly, the cushioning devices 222 provide vibration dampening to the hard disc drive 210 if the hard disc drive system 200 receives any type of impact. The housing bottom 212 includes positioning members 230 which are located substantially at the corners of the mounting plate 220. The positioning members 230 interact with the cushioning devices 222 to provide additional vibration dampening.

Figure 3:
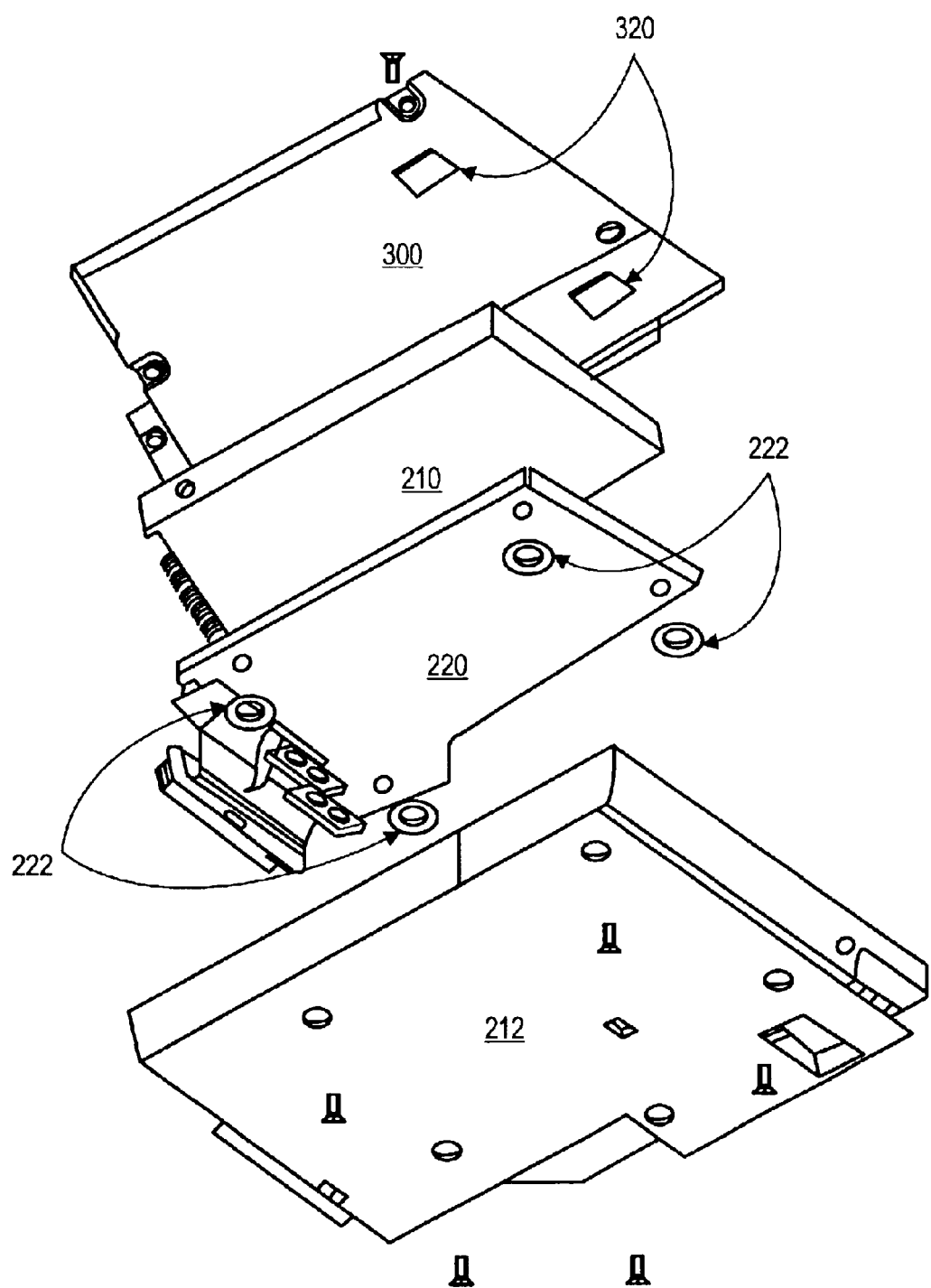
FIG. 3 shows an assembly view of a hard disc drive system.
Figure 4:
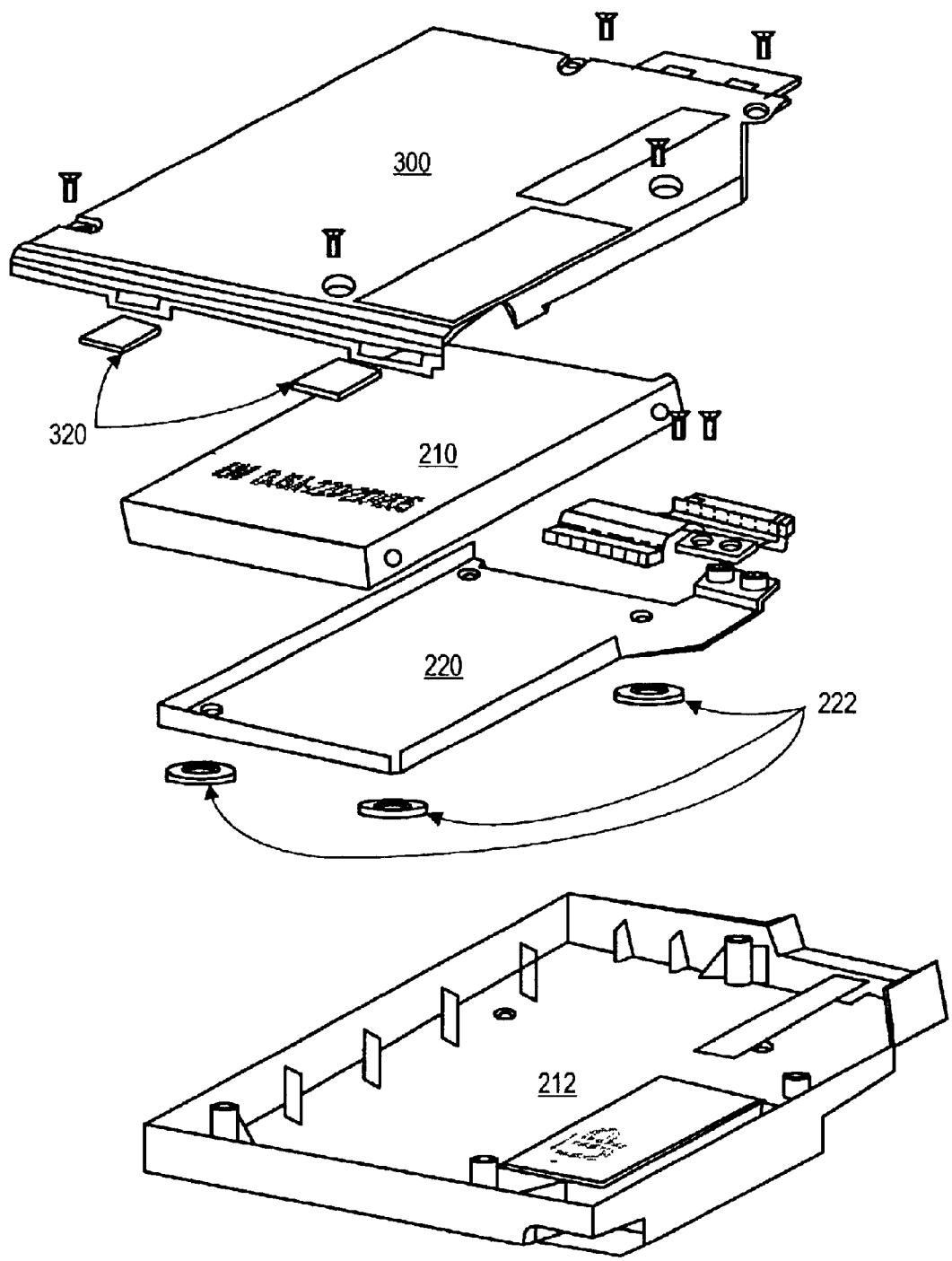
FIG. 4 shows another assembly view of a hard disc drive system.

Referring to FIGS. 3 and 4, hard disc drive system 200 includes a housing top 300, the hard disc drive 210, mounting plate 220, cushioning devices 222 and housing bottom 212. Hard disc drive system 200 also includes cushioning devices 320 located between the top of the hard disc drive 210 and the housing top 300. Hard disc drive system 200 also includes a housing eject mechanism (not shown) which allows the removable hard disc drive system to be removed from the computer system.

The hard disc drive 210 is attached to the mounting plate 220 via screws that are in locations defined by a hard drive industry standard. In a preferred embodiment, the cushioning devices 222 are formed in spheres so that the screws may be easily passed through the middle of the cushioning pieces 222.

Other Embodiments

Other embodiments are within the following claims.

For example, if additional vibration dampening needs arise, the cushioning material may be added to other locations within the hard disc drive housing.

Also for example, it will be appreciated that the cushioning devices may be fabricated from a variety of different materials so long as the material provides sufficient cushioning function.

Also for example, it will be appreciated that additional positioning members may be located to interact with the sides of the mounting bracket. In this case additional cushioning devices are added to the mounting bracket to interact with the additional positioning members.

Also for example, while the cushioning devices are shown as spherical, it will be appreciated that other shapes (such as, e.g., squares or rectangles) may be used. With these shapes, a hole may be located within the cushioning device to allow for mounting of the hard disc drive to the mounting bracket.

What is claimed is:

1. A disc drive system comprising
 a housing bottom;
 a mounting plate coupled to the housing bottom; and
 a disc drive coupled to the housing bottom via cushioning pieces, the housing bottom including positioning members, the positioning members interacting with the cushioning pieces, the positioning members including supports, the supports adding strength to the positioning members wherein the mounting plate includes corners; the positioning members include two perpendicular sides forming a substantially right angle bracket; and, the positioning members are located on the housing bottom to interact substantially with the corners of the mounting plate.

2. The disc drive system of claim 1 wherein the cushioning pieces are constructed of foam.

3. The disc drive system of claim 1 wherein the cushioning pieces include adhesive, the adhesive coupling the disc drive to the mounting plate.

4. The disc drive system of claim 1 further comprising:
 a housing top; and
 top cushioning pieces, the top cushioning pieces being located between the disc drive and the housing top.

5. The disc drive system of claim 1 wherein
 the mounting plate includes sides;
 the positioning members are substantially flat; and,
 the positioning members are located on the housing bottom so as to interact substantially with respective portions of the sides of the mounting plate.

6. An information handling comprising:
 a processor;
 memory coupled to the processor; and
 a disc drive system, the disc drive system including
  a housing bottom;
  a mounting plate coupled to the housing bottom; and
  a disc drive coupled to the housing bottom via cushioning pieces, the housing bottom including positioning members, the positioning members interacting with the cushioning pieces, the positioning members including supports, the supports adding strength to the positioning members wherein the mounting plate includes corners; the positioning members include two perpendicular sides forming a substantially right angle bracket; and, the positioning members are located on the housing bottom to interact substantially with the corners of the mounting plate.

7. The information handling system of claim 6 wherein the cushioning pieces are constructed of foam.

8. The information handling system of claim 6 wherein the cushioning pieces include adhesive, the adhesive coupling the disc drive to the mounting plate.

9. The information handling system of claim 6 further comprising:
 a housing top; and
 top cushioning pieces, the top cushioning pieces being located between the disc drive and the housing top.

10. The information handling system of claim 6 wherein
 the mounting plate includes sides;
 the positioning members are substantially flat; and,
 the positioning members are located on the housing bottom so as to interact substantially with respective portions of the sides of the mounting plate.

11. A removable hard drive comprising a housing top;

a housing bottom coupled to the housing top;

a mounting plate coupled to the housing bottom; and a disc drive coupled to the housing bottom via cushioning pieces, the housing bottom including positioning members, the positioning members interacting with the cushioning pieces, the positioning members including supports, the supports adding strength to the positioning members wherein the mounting plate includes corners; the positioning members include two perpendicular sides forming a substantially right angle bracket; and, the positioning members are located on the housing bottom to interact substantially with the corners of the mounting plate.

12. The removable hard drive of claim 11 wherein the cushioning pieces are constructed of foam.

13. The removable hard drive of claim 11 wherein the cushioning pieces include adhesive, the adhesive coupling the disc drive to the mounting plate.

14. The removable hard drive of claim 11 further comprising:

top cushioning pieces, the top cushioning pieces being located between the disc drive and the housing top.

15. The removable hard drive of claim 11 wherein the mounting plate includes sides;

the positioning members are substantially flat; and, the positioning members are located on the housing bottom so as to interact substantially with respective portions of the sides of the mounting plate.

16. The removable hard drive of claim 11 further comprising an eject mechanism, the eject mechanism interacting with an information handling system to cause the removable hard drive to be removed from an information handling system.

* * * * *